No. 716,963. Patented Dec. 30, 1902.
H. A. TRACY.
SAW TOOTH HOLDER.
(Application filed July 15, 1902.)
(No Model.)
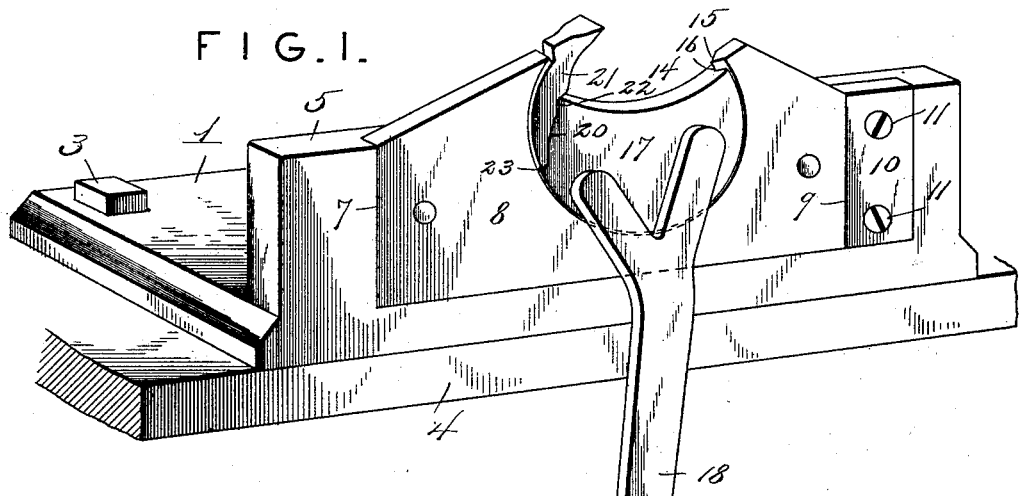
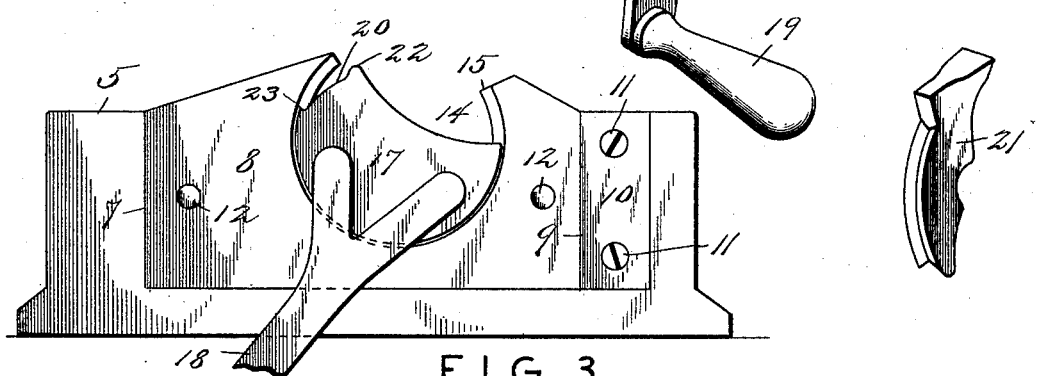 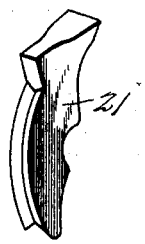
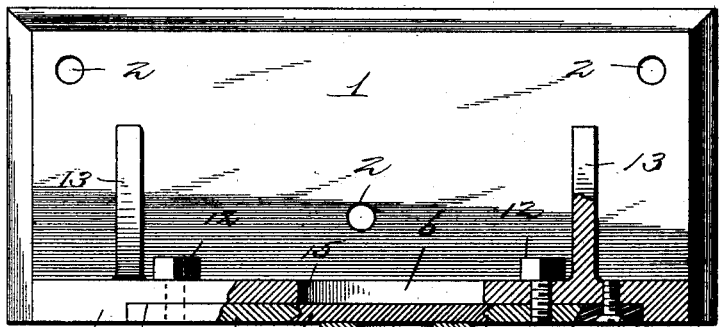
Witnesses
Harry L. Ames
Geo. M. Copenhaver
Inventor
Henry A. Tracy,
By
Rexford M. Smith,
Attorney

UNITED STATES PATENT OFFICE.

HENRY A. TRACY, OF WATERBURY, VERMONT, ASSIGNOR OF ONE-HALF TO LUKE J. ROBERTS, OF WATERBURY, VERMONT.

SAW-TOOTH HOLDER.

SPECIFICATION forming part of Letters Patent No. 716,963, dated December 30, 1902.

Application filed July 15, 1902. Serial No. 115,723. (No model.)

*To all whom it may concern:*

Be it known that I, HENRY A. TRACY, a citizen of the United States, residing at Waterbury, in the county of Washington and State of Vermont, have invented a certain new and useful Saw-Tooth Holder, of which the following is a specification, reference being had therein to the accompanying drawings.

This invention relates to saw-tooth holders, the object in view being to provide a simple, effective, and reliable saw-tooth holder in the nature of a clamp or vise for firmly holding saw-teeth such as are ordinarily employed in connection with circular saws, in which the teeth are detachably mounted, so that they can be removed from the body or blade of the saw whenever it becomes necessary to swage, sharpen, or otherwise treat them.

One of the principal objects of the present invention is to provide a saw-tooth holder the construction of which will admit of the ready insertion of a saw-tooth between the clamping-jaws and enable the shank of the tooth to be firmly clamped by moving one of the jaws, the jaws being so formed and related to each other that the movable jaw is rendered self retaining or locking, thus doing away with the necessity for additional adjustment in order to hold the movable jaw fixed after it has been adjusted for the purpose of clamping the shank of the saw-tooth.

With the above and other objects in view the invention consists in the novel construction, combination, and arrangement of parts, as hereinafter fully described, illustrated, and claimed.

In the accompanying drawings, Figure 1 is a perspective view of a saw-tooth holder complete constructed in accordance with the present invention and showing a saw-tooth held thereby. Fig. 2 is a front elevation of the same with the saw-tooth omitted and the device ready to receive a saw-tooth. Fig. 3 is a sectional plan view of the same. Fig. 4 is a detail perspective view of a detachable circular-saw tooth.

Similar reference-numerals designate corresponding parts in all the figures of the drawings.

The saw-tooth holder contemplated in this invention comprises under the preferred embodiment a base-plate 1 of any suitable size, provided with openings 2 to receive a series of clamping bolts or screws 3, by means of which the device as a whole is adapted to be securely mounted and fastened upon a bench 4 or any other suitable horizontal support. Along one side the base-plate 1 is provided with an upstanding flange or upright 5, having about midway of its length a segmental recess 6, adapted to register with a corresponding recess in the stationary jaw hereinafter described. In its outer surface the upstanding flange 5 is provided with a shallow recess 7, in which is placed a flush-seated plate 8, which constitutes the stationary jaw of the holder. At one end the edge of the jaw 8 is beveled, as shown at 9, so as to fit behind the undercut or dovetailed edge of a keeper 10 in the form of a vertically-extending strip or plate which is received in one end of the recess 7 and held by means of suitable fasteners 11. The stationary jaw 8 is fastened in place after being properly positioned by means of retaining-screws 12 passing through the upstanding flange 5, as best illustrated in Fig. 3. 13 designates braces in the form of ribs, the same being located in the angle between the base-plate 1 and the upstanding flange 5. The stationary jaw 8 is somewhat higher at the center than at the ends and is provided with a segment-shaped recess 14, the edge of the plate bounding said recess being beveled from opposite sides, as shown, to form a guiding-tongue 15, which is received in a corresponding groove 16 in the movable clamping-jaw 17. The movable clamping-jaw 17 is segment-shaped and is provided with an operating-lever 18, which ordinarily extends downward, as shown in Fig. 1, and is provided at its extremity with a handle 19. At or near one corner the jaw 17 is cut away to form a recess 20, which is adapted to receive the shank of a detachable circular-saw tooth 21, the jaw 17 being further provided with a spur or projection 22, which fits into a corresponding recess in the forward edge of the shank of the saw-tooth, as shown in Fig. 1.

The recess 20 also terminates in a shoulder or seat 23, which forms a stop for the heel end of the saw-tooth.

To insert a saw-tooth, the lever 18 is rocked to one side, so as to assume the position illustrated in Fig. 2. The shank of the saw-tooth is then inserted in the recess 20 and the lever moved downward to the position shown in Fig. 1. The projection 22 engages the corresponding recess in the saw-tooth shank and carries the tooth downward to the position shown in Fig. 1, when, owing to the eccentric or cam-shaped formation of the clamping-jaw 17, the saw-tooth is jammed and firmly clamped between the fixed and movable jaws of the holder. At the same time the movable jaw is itself jammed or clamped, the tooth acting in the nature of a wedge, fitting between the fixed and movable jaws. In this way the movable jaw is rendered self-retaining or self-locking, and it is therefore unnecessary to provide any auxiliary means for holding the clamping-jaw 17 or its lever while the saw-tooth is being swaged, sharpened, or otherwise treated. The tooth 21 has the back of its shank grooved in the usual way and receives a portion of the guiding-tongue 15 of the stationary jaw when the tooth is clamped in the holder. By rocking the lever 18 to an approximately horizontal position the movable jaw 17 may be disconnected and removed from the stationary jaw, the opening at the top of the recess 14 being sufficiently large for that purpose.

I do not desire to be limited to the details of construction and arrangement hereinabove set forth and accordingly reserve the right to change, modify, or vary the construction within the scope of the appended claims.

Having thus described the invention, what is claimed as new, and desired to be secured by Letters Patent, is—

1. A saw-tooth holder comprising a jaw having a segment-shaped recess therein, a second segment-shaped jaw mounted in said recess and provided with a recess for the shank of a saw-tooth, and means permanently connected with one of said jaws for oscillating the latter.

2. A saw-tooth holder for swaging purposes and the like comprising a segment-shaped jaw, a second jaw having a segment-shaped recess to receive the first-named jaw, said jaws having a tongue-and-groove engagement with each other, and means for operating one of the jaws.

3. A saw-tooth holder comprising a base, a stationary jaw connected with the base and provided with a segment-shaped recess, a keeper for said stationary jaw, a segment-shaped jaw movably mounted in the recess of the stationary jaw, and means for operating one of the jaws.

4. A saw-tooth holder comprising a base, an upstanding flange thereon provided with a recess, a stationary jaw detachably mounted in said recess and provided with a segment-shaped opening, a segment-shaped clamping-jaw movably mounted in the opening of the stationary jaw, and means for operating one of the jaws.

In testimony whereof I affix my signature in presence of two witnesses.

HENRY A. TRACY.

Witnesses:
MARY A. ROBERTS,
THOMAS J. DEAVITT.